United States Patent [19]
Scheben

[11] 3,885,350
[45] May 27, 1975

[54] LIFTING MECHANISM FOR THE WINDOW OF A VEHICLE

[75] Inventor: Hans Scheben, Koblenz-Rubenach, Germany

[73] Assignee: Stabilus GmbH, Koblenz-Neuendorf, Germany

[22] Filed: Jan. 21, 1974

[21] Appl. No.: 435,116

[30] Foreign Application Priority Data
Jan. 30, 1973 Germany............................ 2304335

[52] U.S. Cl. .................. 49/348; 49/353; 248/188.2
[51] Int. Cl............................................ E05f 11/38
[58] Field of Search ............. 49/324, 326, 348, 353, 49/360, 363, 374; 248/188.2

[56] References Cited
UNITED STATES PATENTS

| | | | |
|---|---|---|---|
| 1,070,363 | 8/1913 | Voight ............................. | 49/363 X |
| 3,388,883 | 6/1968 | Axthammer et al. ............ | 248/188.2 |
| 3,491,484 | 1/1970 | Helm ................................ | 49/348 |

FOREIGN PATENTS OR APPLICATIONS

| | | | |
|---|---|---|---|
| 1,116,571 | 11/1961 | Germany ............................. | 49/353 |

*Primary Examiner*—Kenneth Downey
*Attorney, Agent, or Firm*—Hans Berman

[57] ABSTRACT

An operating mechanism for lifting a window in a motorcar or like vehicle has a lifting lever pivotally mounted on a support normally fixed on the vehicle and means for connecting the window to the lever. A spring interposed between the support and the lever counteracts the weight of the window. It includes a cylinder, a piston assembly projecting from the cylinder, gas under pressure in the cylinder which biases the piston assembly outward of the cylinder, and a blocking device for blocking relative movement of the cylinder and the piston assembly. A motion transmitting train is operatively interposed between a manual operating member mounted on the support, a control arrangement for the blocking device, and the lifting lever for releasing the blocking device and for transmitting motion from the operating member to the lever when the operating member is moved on the support.

13 Claims, 4 Drawing Figures

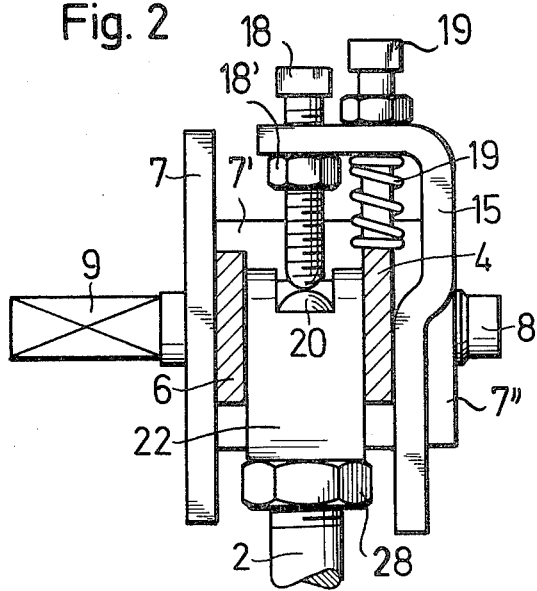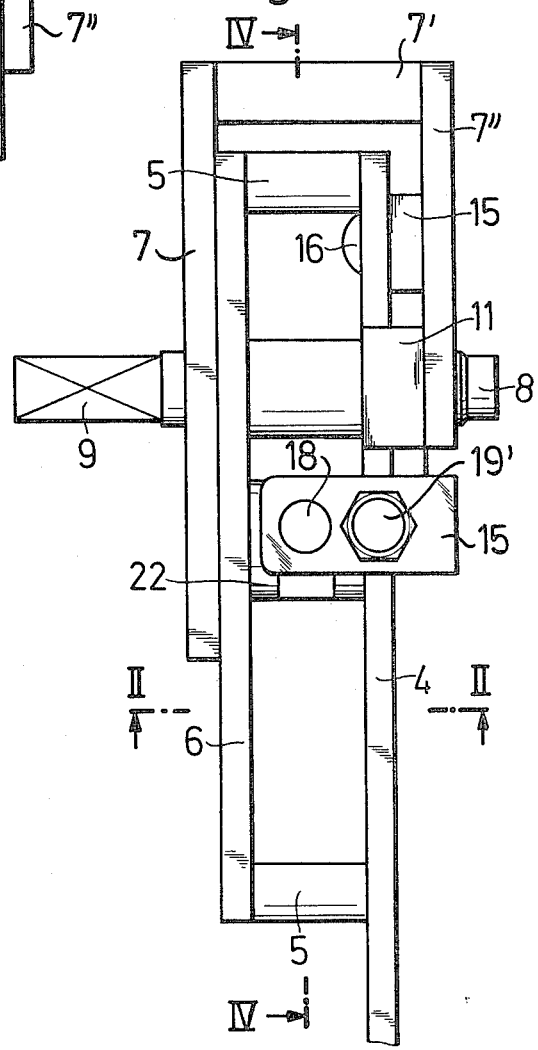

LIFTING MECHANISM FOR THE WINDOW OF A VEHICLE

This invention relates to load lifting mechanisms, and particularly to an operating mechanism for lifting a load, such as a window in a motorcar, motorboat, or like vehicle.

The windows in the doors of many motorcars are manually opened or closed by means of cranks mounted on the inner face of the door. For shifting a window between the fully opened and the fully closed position, several turns of the crank are usually required. While this is not an undue burden to the driver when the car stands still, opening or closing the window on the driver's side while the motorcar is moving requires more of the driver's attention than may safely be diverted from the task of driving the vehicle. Electric and hydraulic window lifting mechanisms have therefore been installed in relatively expensive private cars, but are not economically acceptable in less luxurious vehicles, including trucks, motorboats, and locomotives.

The primary object of the invention is the provision of a load lifting mechanism suitable for operating a motorcar window which avoids the high transmission ratio, and consequent multiple crank turns, of the usual mechanical operating mechanism for a motorcar window, yet is simple in its structure and less costly than an electric or hydraulic window operating mechanism.

More specifically, it is an object of this invention to provide a basically mechanical load lifting mechanism for use in a motorcar window which can be operated by angularly moving a pivotally mounted, manual operating member through an arc of less than 360°, and preferably less than 90°, without requiring the excessive effort that would be necessary in a conventional window operating mechanism if the transmission ratio between the usual window crank and the window pane were changed to reduce the angular crank movement.

With these and other objects in view, the invention provides an operating mechanism in which a lifting lever is pivotally mounted on a support and is equipped with means for connecting a load to be lifted to the lever. A gas spring is operatively interposed between the support and the lever for counteracting the weight of the load. The spring is of the type in which a piston assembly is received in a cylinder and projects from the same. A body of gas under pressure in the cylinder biases the piston assembly outward of the cylinder, but relative movement of the cylinder and piston assembly may be blocked. A control mechanism is provided for releasing the blocking device. A manual operating member movably mounted on the support is connected by a motion transmitting train to the lifting lever and to the control mechanism for actuating the control mechanism and for transmitting motion from the operating member to the lifting lever when the operating member is moved on the support.

Other features, additional objects, and many of the attendant advantages of this invention will readily become apparent from the following detailed description of a preferred embodiment when considered in connection with the appended drawing in which:

FIG. 2 shows a portion of the mechanism of FIG. 1 in front elevational section on the line II—II in FIG. 3;

FIG. 3 illustrates the device of FIG. 2 in top plan view; and

Figure 1:
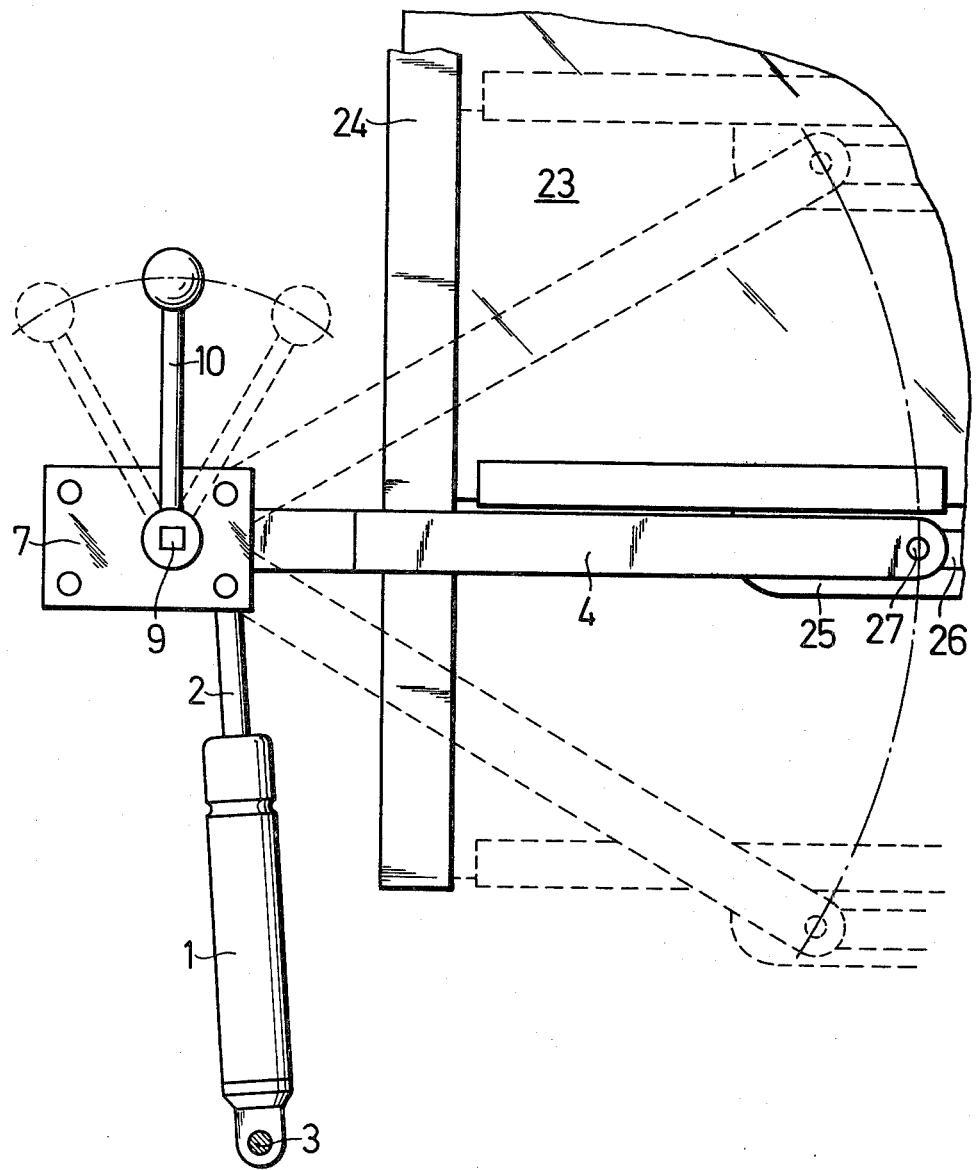
FIG. 1 is a fragmentary side-elevational view of the door in a motorcar equipped with the window lifting mechanism of the invention.

Referring now to the drawing in detail, and initially to FIG. 1, there is seen a door of a motorcar equipped with the window lifting mechanism of the invention, only as much of the otherwise conventional door being shown as is needed for an understanding of the invention. A hydropneumatic spring, whose visible elements are a cylinder 1 and a piston rod 2, is hingedly attached to a stud 3 by an eye on the axial end of the cylinder 1 which is remote from the piston rod 2. The stud 3 is a fixed element of the door structure largely broken away in the view of FIG. 1 to reveal the device of the invention.

The piston rod 2 is secured to a window lifting lever 4 in a manner presently to be described. The window has a glass pane 23 which is guided laterally by upright channels 24 of which only one is seen, and which are fixed elements of the car door. The bottom edge of the pane 23 is received in a channel of a bracket assembly 25. A horizontal guide groove 26 in the assembly 25 movably receives a pin 27 fastened to the end of the lever 4 remote from the piston rod 2.

The lever 4 is fulcrumed on a shaft of which one end 9, of square cross section, projects from the car door in the fully assembled condition of the latter. The shaft end 9 is conformingly received in a bore of an operating arm 10 and journaled in a front plate 7 of a mounting and support bracket fixedly attached to the car door in a conventional manner, not shown. Except for the operating arm 10, shaft end 9, and window pane 23, the elements illustrated in FIG. 1 are normally obscured by the walls of the door, not themselves seen in FIG. 1.

The arm 10 is approximately perpendicular to the lever 4 in all operating conditions of the device so that the window pane 23 is in the half open position, shown in fully drawn lines, when the arm 10 is upright, and moves into the fully open and fully closed positions, as shown in broken lines, when the arm 10 is pivoted about 30° in either direction from the upright position.

The supporting and mounting bracket 7 has been shown in FIG. 1 to be offset relatively far to one side of the window pane 23 for the sake of clarity. Actually, it may be mounted closely adjacent the guide channel 24, or directly below the window pane 23.

Figure 4:
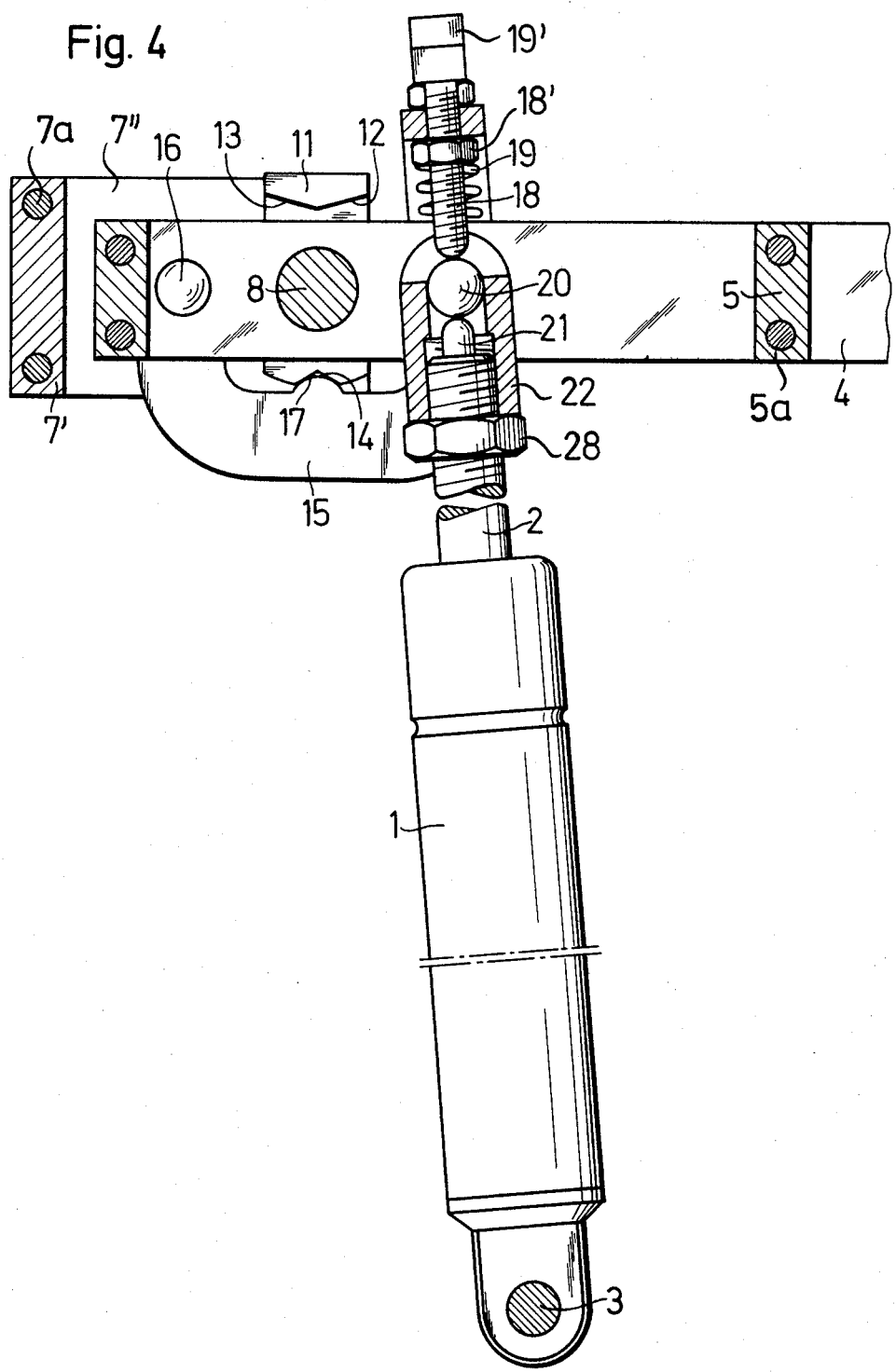
FIG. 4 is a side-elevational section of the same device taken on the line IV—IV in FIG. 3.

Details of the motion transmitting train connecting the piston rod 2, the lever 4, and the arm 10 are evident from FIGS. 2 to 4.

The flat front plate 7 is an element of a mounting and support bracket which is J-shaped in the plan view of FIG. 3 and additionally includes a short cross member 7', a flat rear plate 7'', and fastening screws 7a. The shaft 8, whose square end 9 is seen in FIG. 1, is rotatably received in aligned bores of the plates 7, 7'' and axially secured. The portion of the lever 4 on either side of the shaft 8 is reinforced by a parallel strap 6 of the same flat bar stock as the lever 4. The strap 6 is fixedly attached to the lever 4 by spacers 5 and screws 5a at the two longitudinal ends of the strap 6. The shaft 8 movably passes through bores in the lever 4 and the strap 6.

A motion transmitting member 11 is fixedly mounted on the shaft 8 between the lever 4 and the rear plate 7'' and projects upward and downward beyond the lever 4, as is best seen in FIG. 4. The upper end of the member 11 is angularly offset and has two abutment faces 12, 13 facing the narrow top edge of the lever 4 in the illustrated position of the apparatus. The faces 12, 13 respectively engage the lever 4 when the shaft 8 is turned clockwise or counterclockwise from the illustrated position. The bottom end of the member 11 has a downwardly open, V-shaped notch 14 whose flat sides meet at an obtuse apex angle.

A rocker 15 has two portions which are approximately L-shaped in the respective planes of FIGS. 4 and 2. The free ends of the long legs of the two L-shapes are integrally joined. The short leg of the first rocker portion is attached to the short arm of the lever 4 remote from the window pane 23 by a pin 16 for pivotal movement in a vertical plane. The long leg of the first rocker portion carries an integral projection having a cylindrically arcuate cam face 17 received in the notch 14 of the motion transmitting member 11 (FIG. 4).

The long leg of the second rocker portion, best seen in FIG. 2, passes upward along the lever 4, and the short leg of the second rocker portion carries an approximately vertically dependent, threaded pin 18 and also a helical compression spring 19 interposed between the rocker 15 and the top edge of the lever 4. The pin 18 and the spring 19 are offset from the shaft 8 toward the long arm of the lever 4, as is evident from FIGS. 3 and 4. Nuts 18' on the pin 18 and a screw 19' providing an abutment for the spring 19 on the rocker 15 permit vertical adjustment of the pin 18 and the spring 19.

The two leg portions of an approximately U-shaped shackle 22 are threadedly fastened to the free end of the piston rod 2 and secured by a locking nut 28. A steel ball 20 is fixedly held in the position illustrated in FIG. 4 between the slotted bight of the shackle 22 and the projecting, rounded, free end of a valve control rod 21 slidably received in the piston rod 2. The pin 18 passes through the slot in the shackle 22 and engages the ball 20.

The hydropneumatic spring of which only the cylinder 1 and the piston rod 2 are shown in FIG. 1 of the drawing, is of the type known, for example, from the Axthammer et al. U.S. Pat. No. 3,388,883. As is shown in FIG. 4, the piston rod 2 carries a piston 30 in the cavity of the cylinder 1, and a passage extending axially through the piston is normally sealed by a valve 31 attached to the end of the control rod 21 which is not visible in FIG. 1. The compartment of the cylinder 1 below the piston 30 is divided by a floating seal 32. Liquid fills the cylinder 1 above the seal, and a cushion of compressed gas under the seal exerts pressure on the liquid and yieldably biases the control rod 21 toward the position shown in FIG. 4 with a force much greater than that of the spring 19, thereby keeping the valve in the piston closed, and preventing movement of the piston rod 2 relative to the cylinder 1. When the valve 31 in the cylinder 1 is opened by pushing the control rod 21 inward of the cylinder 1, the piston rod 2 may move outward of the cylinder 1 under the force exerted by the compressed gas in the cylinder 1, or the piston rod 2 may be moved inward of the cylinder 1 under axial forces exerted on the piston rod.

In the position of the window lifting mechanism illustrated in FIG. 1 in fully drawn lines and in FIG. 4, the weight of the window pane 23 rests on the long arm of the lever 4 carrying the bracket assembly 25, and tends to turn the lever clockwise, as viewed in FIGS. 1 and 4. The liquid blocked by the valve 31 in the cylinder 1 holds the piston rod 2, the control rod 21 and the attached shackle 22 and ball 20 in the illustrated position relative to the cylinder 1. The rocker 15 is fulcrumed on the cam face 17 and the engaged walls of the notch 14. The blocking force transmitted from the piston rod 2 to the rocker 15 by the ball 20 and the pin 18 prevents the rocker 15 from pivoting clockwise on its fulcrum, whereby a counterclockwise blocking force is exerted on the lever 4 by the pivot pin 16. The liquid sealed in the cylinder 1 thus counteracts the weight of the window 23 and holds the window in the set position as long as the arm 10 is in the illustrated upright position.

When the arm 10 is turned clockwise, as viewed in FIG. 1, the actuating member 11 is pivoted. The cam face 17 is thereby moved away from the apex of the notch 14, and the rocker 15 is pivoted clockwise on the pin 16, as viewed in FIG. 4. The pin 18 pushes the ball 20 and the control rod 21 inward of the cylinder 1, thereby opening the valve 31 between the liquid-filled compartments of the cylinder so that the compressed gas cushion can be moved by or move the piston 30 and the piston rod 2.

During further clockwise movement of the shaft 8 and the actuating member 11, the abutment face 12 engages the long arm of the lever 4 so that the force manually applied to the arm 10 is added to the forces of gravity acting on the window pane 23 and associated elements. The pressure of the gas cushion in the cylinder 1 is selected so that it balances these forces of gravity. The force manually applied to the lever 4 thus need only overcome the friction between the window pane 23 and the guide channels 24, the friction between the non-illustrated piston and the cylinder 1, and minor frictional forces elsewhere in the illustrated mechanism. The combined frictional forces are only a small fraction of the gravitational forces involved, and very little effort is required to open the window by means of the arm 10. As soon as the arm is released, the spring 19 returns the pin 18 to the illustrated position, the gas pressure in the cylinder 1 closes the blocking valve 31, and the cam face 17 returns to the apex of the notch 14. The window is locked in the open position.

When the arm 10 is turned counterclockwise from the position fully drawn in FIG. 1, the walls of the notch 14 and the cam face 17 cooperate as described above to depress the control rod 21 so that the valve 31 in the cylinder 1 is opened, and the lever 4 can be pivoted counterclockwise by expansion of the gas cushion in the cylinder 1 and by the manual force transmitted from the arm 10 to the lever 4 by the abutment face 13 of the motion transmitting member 11. The window is closed, and held in the closed position by the blocked liquid in the cylinder 1 when the arm 10 is released.

The rocker 15 moves with the lever 4 so that the pin 18 may not always be aligned with the axis of the cylinder 1 and the control rod 21. The interposed ball 20 which is guided axially in the shackle 22 prevents bending of the rod 21 by the transmitted forces.

The hydropneumatic spring of the afore-mentioned earlier patent is preferred in the window-lifting mechanism of the invention, but it may be replaced by a different gas spring in which a body of gas tends to expel a piston assembly from a cylinder, and in which relative movement between the piston assembly and of the cylinder member is blocked by a mechanical brake or any equivalent thereof which may be controlled by a motion transmitting train interposed between a manual operating member and the control device.

The mechanism described with reference to FIGS. 2 to 4 has found a particularly advantageous field of application in the windows of motorcars, but it may be employed for lifting other loads.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. An operating mechanism for lifting a load comprising, in combination:
   a. a support;
   b. a lifting lever pivotally mounted on said support;
   c. means for connecting the load to be lifted to said lever;
   d. spring means operatively interposed between said support and said lever for counteracting the weight of said load, said spring means including
      1. a cylinder member,
      2. a piston assembly received in said cylinder member and projecting therefrom,
      3. a body of gas under pressure in said cylinder member and biasing said piston assembly outward of said cylinder member, and
      4. blocking means for blocking relative movement of said cylinder member and of said piston assembly;
   e. control means for releasing said blocking means;
   f. a manual operating member movably mounted on said support; and
   g. motion transmitting means operatively interposed between said lifting lever, said control means, and said operating member for actuating said control means and for transmitting motion between said operating member and said lever when said operating member is moved on said support.

2. A mechanism as set forth in claim 1, wherein said operating member is pivotally mounted on said support, and said motion transmitting means include means responsive to clockwise pivotal movement and to counterclockwise pivotal movement of said operating member for actuating said control means.

3. A mechanism as set forth in claim 2, wherein said lever and said operating member are mounted on said support for pivotal movement about a common axis.

4. A mechanism as set forth in claim 3, wherein said motion transmitting means include a motion transmitting member secured to said operating member for joint pivotal movement, respective abutting faces of said motion transmitting member engaging said lever during said clockwise and said counterclockwise pivotal movement of said operating member.

5. A mechanism as set forth in claim 4, said motion transmitting means including a motion transmitting train interposed between said motion transmitting member and said control means for actuating said control means in response to said pivotal movement of said motion transmitting member.

6. A mechanism as set forth in claim 5, wherein said motion transmitting train includes a rocker member pivotally mounted on said lever for engagement by said motion transmitting member, and a releasing member mounted on said rocker member for engagement with said control means.

7. A mechanism as set forth in claim 6, wherein said motion transmitting means further include cooperating cam means on said rocker member and on said motion transmitting member for actuating said control means during said pivotal movement of said motion transmitting member.

8. A mechanism as set forth in claim 2, further comprising means limiting said pivotal movement of said actuating member to less than 360°.

9. A mechanism as set forth in claim 2, further comprising means limiting pivotal movement of said actuating member to less than 90°.

10. A mechanism as set forth in claim 1, wherein said motion transmitting means include means for first actuating said control means, and for transmitting motion between said operating member and said lever after said blocking means are released by the actuated control means.

11. A window arrangement comprising, in combination:
    a. a window pane;
    b. guide means for guiding said window pane in a vertically extending path; and
    c. an operating mechanism as set forth in claim 1, said window pane constituting said load, and said guide means being fixedly connected to said support.

12. A mechanism as set forth in claim 1, wherein said operating member is pivotally mounted on said support, and said motion transmitting means include actuating means responsive to clockwise pivotal movement of said operating member for acutating said control means, and for thereby releasing said blocking means, and for transmitting motion to said lever in one direction, said actuating means being responsive to counterclockwise pivotal movement of said operating member for actuating said control means, and for thereby releasing said blocking means, and for transmitting motion to said lever in a direction opposite to said one direction.

13. A mechanism as set forth in claim 12, wherein said actuating means include means for actuating said control means before motion is transmitted to said lever in said one direction and in said opposite direction.

* * * * *